US006888850B2

(12) United States Patent
Perini et al.

(10) Patent No.: US 6,888,850 B2
(45) Date of Patent: May 3, 2005

(54) MODULAR HOME/OFFICE MULTI-MEDIA DISTRIBUTION SYSTEM

(75) Inventors: Patrick L. Perini, Broomfield, CO (US); Jamal Boudhaouia, Littleton, CO (US); Tony Sweets, Westminster, CO (US)

(73) Assignee: Qwest Communications International, Inc., Denver, CO (US)

( * ) Notice: Subject to any disclaimer, the term of this patent is extended or adjusted under 35 U.S.C. 154(b) by 510 days.

(21) Appl. No.: 09/683,164

(22) Filed: Nov. 28, 2001

(65) Prior Publication Data

US 2003/0099259 A1 May 29, 2003

(51) Int. Cl.[7] .................................................. H04J 1/00
(52) U.S. Cl. ........................................ 370/486; 370/487
(58) Field of Search ................................ 370/352–356, 370/389, 401, 395.5, 463, 485, 486, 487, 488, 489, 490; 348/385.1; 725/105, 86, 74, 62, 63, 106, 114, 129, 138

(56) References Cited

U.S. PATENT DOCUMENTS

| | | | |
|---|---|---|---|
| 5,379,298 A | 1/1995 | Saiki et al. | |
| 5,691,713 A | 11/1997 | Ishida | |
| 5,922,047 A | 7/1999 | Newlin et al. | |
| 6,130,917 A | 10/2000 | Monroe | |
| 6,154,465 A | * 11/2000 | Pickett | ........................ 370/466 |
| 6,157,968 A | 12/2000 | Baruch et al. | |
| 6,216,166 B1 | 4/2001 | Zheng et al. | |
| 6,396,849 B1 | * 5/2002 | Sarkissian et al. | .......... 370/490 |
| 2002/0012353 A1 | * 1/2002 | Gerszberg et al. | |
| 2002/0031120 A1 | * 3/2002 | Rakib | |

* cited by examiner

Primary Examiner—Ajit Patel
(74) Attorney, Agent, or Firm—Townsend and Townsend and Crew LLP

(57) ABSTRACT

A Modular Residential Multi-Media Distribution System provides a single centralized interface for all external Wide Area Networks (WANs) which are received into the home/office environment. The MRMDS allows extensive modular flexibility in re-provisioning new services via changing or adding removable interfaces. Each WAN is individually connected to a distributor in the MRMDS. The MRMDS distributor interfaces the external WANs to a multiple of home/office Home Network Interfaces for distribution to a multiple of communication devices.

20 Claims, 3 Drawing Sheets

MODULAR HOME/OFFICE MULTI-MEDIA DISTRIBUTION SYSTEM

BACKGROUND OF INVENTION

The present invention relates to a distribution system for a multiple of Wide Area Networks, and more particularly to a central Modular Residential Multi-Media Distribution System which provides a central link between a Plurality of Wide Area Networks and a plurality of devices within a home/office environment.

Currently a multiple of communication, data, and entertainment services are delivered to a customer via separate interface links. For example, a cable company provides a Wide Area Network (WAN) and each customer receives a hardware device such as a set top box so that the customer's television can receive content from the WAN. Similarly, other interface link hardware such as wireless receivers (i.e., satellite), cable modems, Digital Subscriber Lines (DSL) modem, or analog modems are distributed by each independent service provider. Using the supplied communication link, each customer can thereby access the content supplied through that service provider's WAN.

Disadvantageously, each customer must obtain a separate interface link and be physically wired to access each service providers' content. In many instances, independent wiring such as telephone copper wire, co-axial cable, antenna connection, or the like must be installed in the home office environment for each service provider. Moreover, such wiring may be quite extensive should a customer desire that a multiple of interface links be provided for a multiple of communication devices. This is time consuming, expensive, and commonly requires extensive upgrading for each new or different service.

Accordingly, it is desirable to provide flexible access to a multiple of WANs. It is further desirable to provide security features to this access.

SUMMARY OF INVENTION

The Modular Residential Multi-Media Distribution System (MRMDS) according to the present invention provides a single centralized interface for all external Wide Area Networks (WANs) which are received into the home/office environment. The MRMDS allows extensive modular flexibility in re-provisioning new services via changing or adding to the MRMDS as will be further described.

Each WAN is individually connected to a distributor in the MRMDS. The distributor preferably includes a multiple of removable external interfaces related to the respective WAN. The MRMDS distributor interfaces the external WANs to a multiple of home/office Home Network Interfaces (HNIs.) In one embodiment of the present invention, a passive distributor directly connects each external interface to one or more respective HNIs. The HNIs may provide, for example only, a feed through circuit a divider circuit, a hub, or other link.

In another embodiment of the present invention, an active distributor includes a Digital Distributing Processing Unit (DDPU). The DDPU further increases the flexibility of component interconnection and communication. Moreover, the DDPU provides a central interface for security, authentication and other functions and performs the distribution from the WANs to the HNIs such that any of the communication devices on any of the home networks may communicate with any other communication device.

The present invention therefore provides single point flexible access to a multiple of WANs.

BRIEF DESCRIPTION OF DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
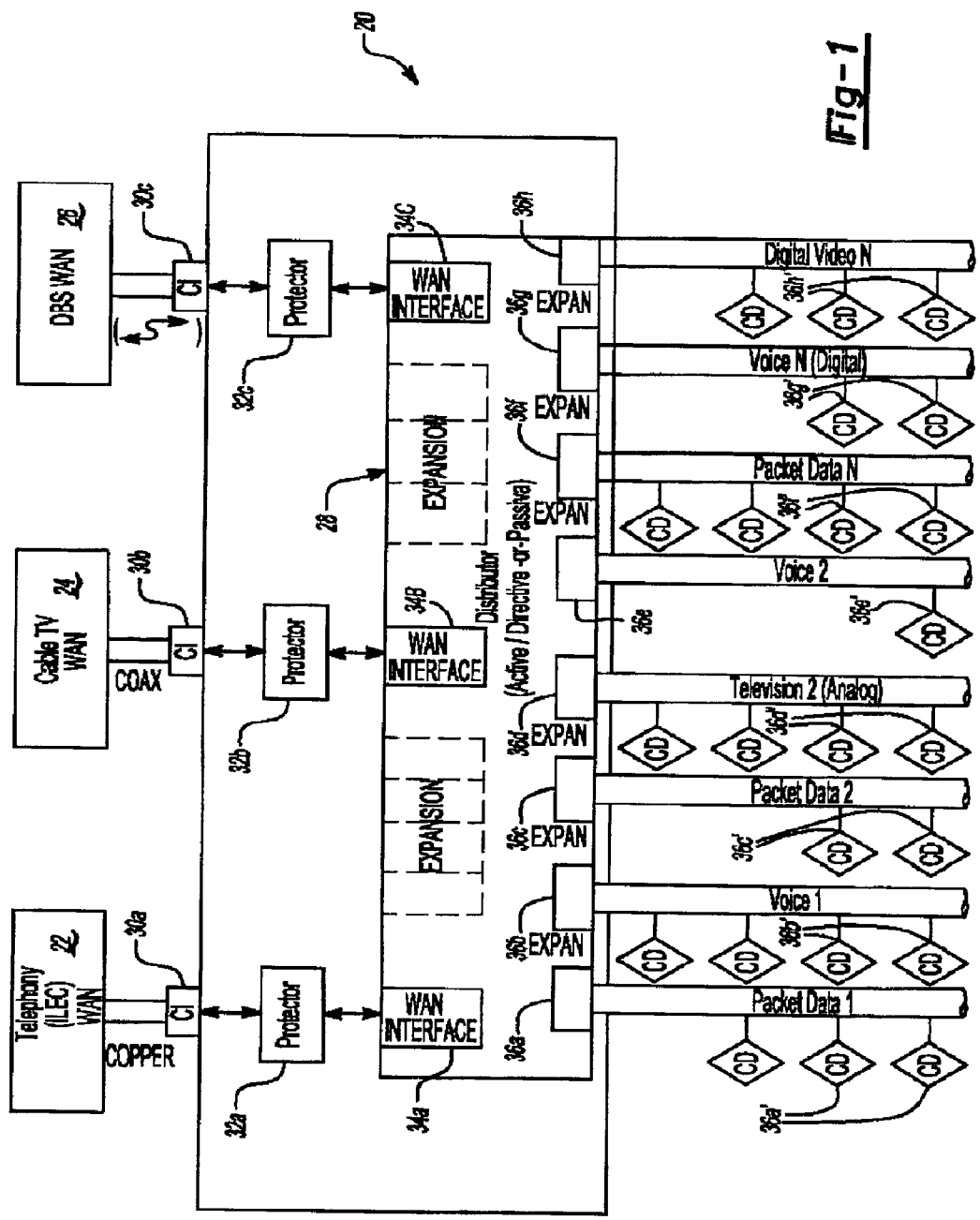
FIG. 1 is a schematic block diagram of a Modular Residential Multi-Media Distribution System according to the present invention.

FIG. 1 illustrates a schematic view of a Modular Residential Multi-Media Distribution System (MRMDS) 20 for a home/office environment according to the instant invention. The MRMDS 20 provide a single centralized interface for all external Wide Area Networks (WANs) which are received into the home/office environment. The MRMDS 20 allows extensive modular flexibility in re-provisioning new services via changing or adding to the MRMDS 20 as will be further described.

A multiple of WANs such as Telephony (copper wire), Cable television (coax cable) and a Direct Broadcasting Service (DBS) (satellite/wireless) providers are illustrated schematically at 22, 24, and 26 respectively. It should be understood that although only particular service provides are illustrated in the disclosed embodiment, many other service providers will also benefit from the present invention. Each WAN 22–26 is individually connected to a distributor 28 in the MRMDS 20 through a connection (illustrated schematically at 30) and a protector (illustrated schematically at 32a–32l). The connection 30a–30c is preferably a hardware connector such as a jack, plug, cable connector or the like which provides the hardware connection between a WAN and the MRMDS 20.

Each protector 32 preferably provides hardware protection. That is, each protector 32 includes hardware protection such as surge protection.

From each WAN card 34a–c, the distributor 28 decodes and directs the content from the respective WAN 22–26. The distributor 28 includes a multiple of removable WAN interfaces 34a–34c related to the respective WAN 22–26. The interfaces 34a–34c decode the content provided by the WANs 22–26. For example only, interface 34a includes a DSL modem card to provide communication with the DSL WAN 22. It should be understood that the term card encompasses any removable device or component which communicates with the distributor 28. The distributor 28 preferably includes integral input/output connectors such that the cards 34a–34c may be removably "plugged" into the distributor 28. Preferably, the distributor 28 is modular to replacement cards or other devices for communication between new or updated HNIs. Other integrated circuit or hard-wired interfaces will also benefit from the present invention.

The MRMDS 20 distributor 28 interfaces the external WANs 22–26 (connected to WAN interface cards 34a–34c) to a multiple of home/office Home Network Interfaces (HNI) 36a–36h. It should be understood that HNIs include a multiple of communication devices which receive content from a central distribution point. Each HNI 36a–36h communicates the content from a particular WAN 22–26 to one or more communication devices 36a'–36h' connected to its respective HNI 36a–36h. The MRMDS 20 therefore provides a central point for a multiple of communication devices 36a'–36h' on a multiple of HNIs 36a–36h to receive content from a multiple of WANs 22–26. Further, by the substitution or addition of other external interfaces and HNIs to the MRMDS 20, upgraded or addition content is available throughout the home/office environment without the necessity of multiple interface units or additional independent connections to service providers.

Figure 2:
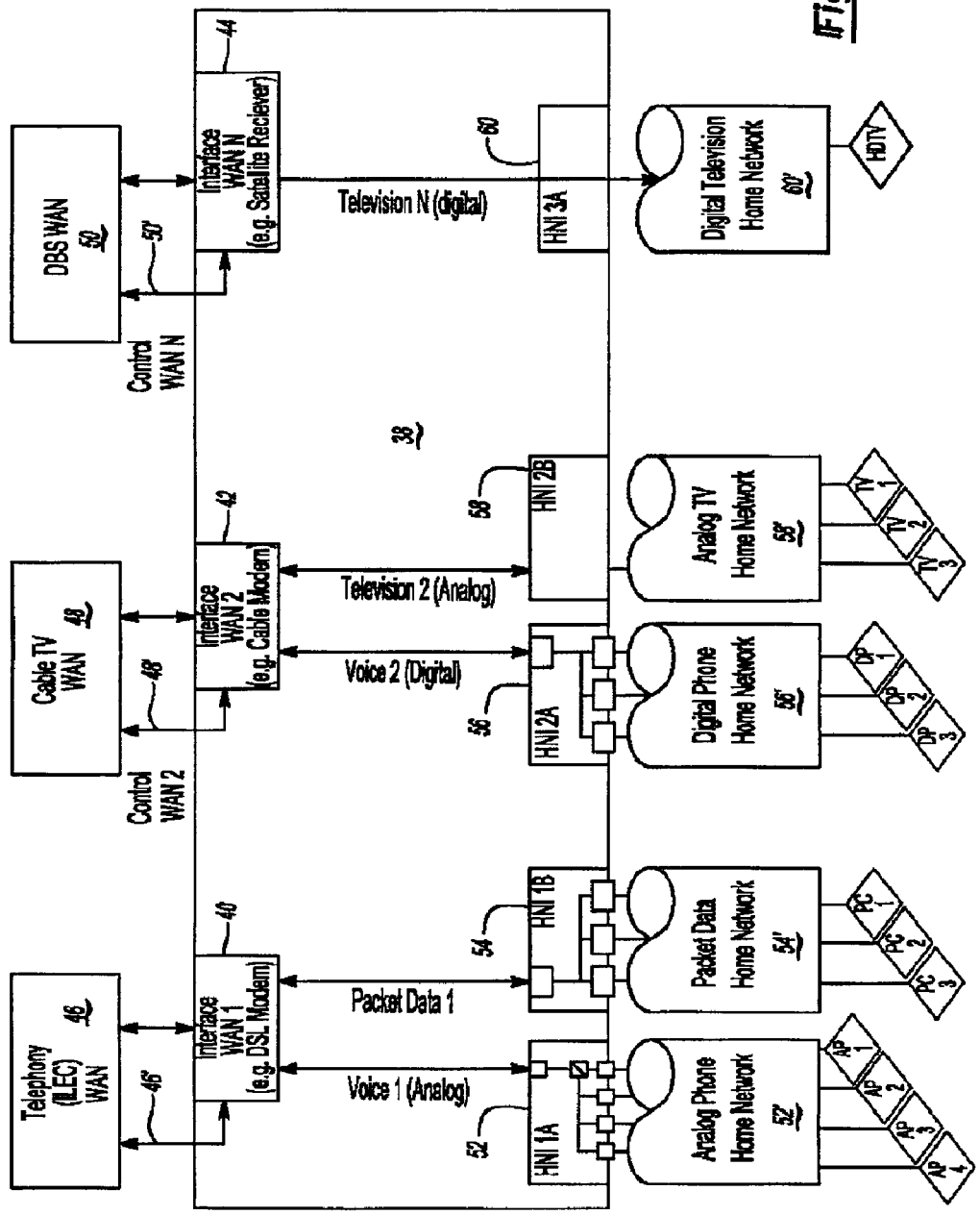
FIG. 2 is a schematic block diagram of a passive distributor for use with the Modular Residential Multi-Media Distribution System of FIG. 1.

A passive distributor 38 for use with the MRMDS 20 is schematically illustrated in FIG. 2. The passive distributor 38 provides direct communication from a multiple of external WANS to their respective WAN interfaces (illustrated schematically at 40, 42 and 44.) The interfaces 40–44 in the illustrated embodiment are respectively, a DSL modem, a cable modem, and a satellite receiver decoder which communicate with their respective service provider WAN 46,48 and 50 through protectors (FIG. 1). Preferably, the interfaces 40–44 receive control signals 46', 48' and 50' which allows the WAN interfaces 40–44 to be configured and/or upgraded with new software, firewall protection or the like.

The distributor 38 directly connects each external interface 40–44 to one or more respective HNIs, (illustrated schematically at 52–60). The HNIs 52–60 are preferably removable cards or the like, each of which provide interconnection of a multiple of devices such as an analog phones, personal computers, digital phones, analog television, digital televisions or the like (illustrated schematically at 52'–60'.) The HNIs 52–60 may provide, for example only, a feed through circuit (60; HNI 3A,) a divider circuit (52; HNI 1A and 58; HNI 2B,) a hub (56; HNI 1B and 56; HNI 2A) or other link. For example, the DSL Modem of WAN interface 40 provides two separate channels (analog voice 1 and packet data 1) such that two separate Home Network Interfaces (divider HNI 1A and hub HNI 1B) are supplied thereby. Although particular HNIs are illustrated in the disclosed embodiment, other HNIs will also benefit from the present invention.

Figure 3:
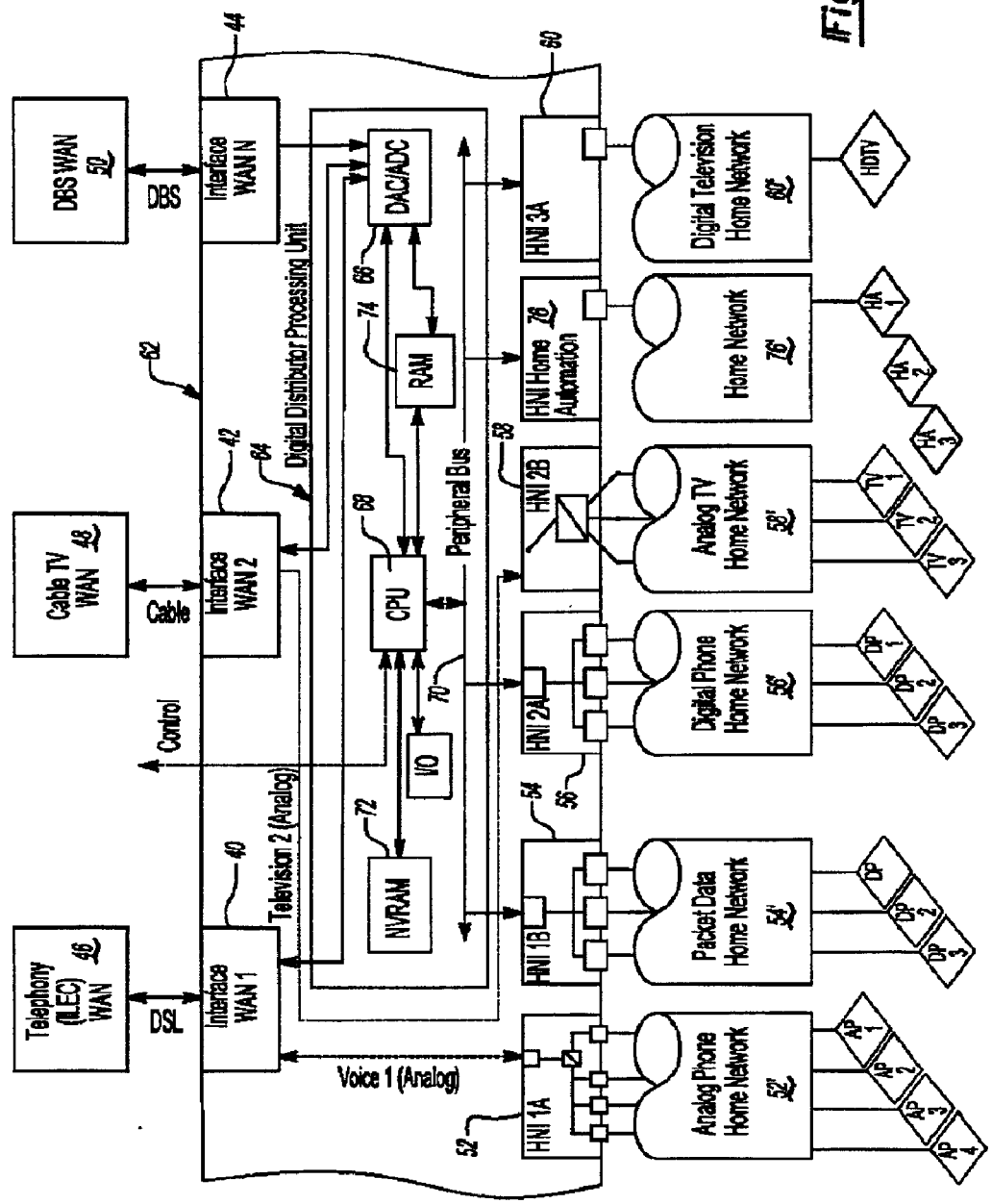
FIG. 3 is a schematic block diagram of an active distributor for use with the Modular Residential Multi-Media Distribution System of FIG. 1.

An active distributor 62 for use with the MRMDS 20 is schematically illustrated in FIG. 3. The active distributor 62 includes a similar WAN and HNI architecture as the passive distributor 38 (FIG. 2) and further includes a Digital Distributing Processing Unit (DDPU) 64. The analog signals from the external interfaces 40–44 are provided to HNI 1A (analog voice 1) and HNI 2B (television 2 analog) in a direct manner as described in FIG. 2. All digital signals from the external interfaces 40–44, however, are first routed to a digital/analog analog/digital converter (DAC/ADC) 66 of the DDPU 64 for digitizing.

The digitized signals from the DAC/ADC 66 are sent to a Central Processing Unit (CPU) 68 for distribution to the HCls over a peripheral bus 70. Preferably, a nonvolatile random access memory (NVRAM) 72 stores MRMDS 20 information such as passwords, operating system instructions, configuration management and the like in cases where power to the MRMDS 20 is interrupted. Random access memory 74 is further provided for storage as needed for normal operation of the CPU 68. I/O devices which may include a hard drive, CD ROM, DVD, ROM or other optically readable storage, magnetic storage or integrated circuit. The DDPU 64 further increases the flexibility of component interconnection and communication. Moreover, the DDPU 64 provides a central interface for security, authentication and other functions. For example, remote communication, passwords, firewall protection, and the like are centralized in the DDPU64 to provide security for all devices connected thereto.

The DDPU 64 also performs the distribution from the WANs 40–44 to the HNIs such that any of the communication devices on any of the home networks may communicate with any other communication device. For example, a personal computer attached to HNI 1B communicates with a home automation device interface 76 through the peripheral bus 70 such that controls 76" (thermostat, lights, etc.) connected thereto are controllable by the personal computer.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A multi-media distribution system comprising:
   a distributor having a plurality of locations;
   a Digital Subscriber Line external interface receivable within one of said plurality of locations, said Digital Subscriber Line external interface operable to receive analog voice content and digital packet data content from a first Wide Area Network;
   a cable service external interface receivable within one of said plurality of locations, said cable service external interface operable to receive digital voice content and analog television content from a second Wide Area Network;
   a first home network interface including a divider circuit receivable within one of said plurality of locations, said first home network interface in communication with said Digital Subscriber Line external interface to distribute the analog voice content to at least one communication device;
   a second home network interface including a Local Area Network Hub receivable within one of said plurality of locations, said second home network interface in communication with said Digital Subscriber Line external interface to distribute the analog television content to at least one communication device;
   a third home network interface including a Local Area Network Hub receivable within one of said plurality of locations, said third home network interface in communication with said cable service external interface to distribute the digital voice content to at least one communication device; and
   a fourth home network interface including a divider circuit receivable within one of said plurality of locations, said third home network interface in communication with said cable service external interface to distribute the analog television content to at least one communication device.

2. The multi-media distribution system as recited in claim 1, furthering including:
   a Direct Broadcasting Service external interface receivable within one of said plurality of locations, said Direct Broadcasting Service external interface operable to receive digital television content from a third Wide Area Network.

3. The multi-media distribution system as recited in claim 1, further including a fifth home network interface including a feed through circuit receivable within one of said plurality of locations, said fifth home network interface in communication with a Direct Broadcasting Service external interface to distribute the digital television content to at least one communication device.

4. The multi-media distribution system as recited in claim 1, furthering including: a digital/analog-analog/digital converter in communication with said external interface;
   a central processing unit in communication with said digital/analog-analog/digital converter; and
   a peripheral bus in communication with said central processing unit to communicate said content to said home network interface.

5. The multi-media distribution system as recited in claim 4, wherein said peripheral bus communicates between a plurality of home network interfaces.

6. The multi-media distribution system as recited in claim 3, wherein the Direct Broadcasting Service comprises satellite television.

7. The multi-media distribution system as recited in claim 1, wherein said at least one communications device is selected from the group consisting of analog phones, personal computers, digital phones, analog televisions, and digital televisions.

8. A multi-media distribution system comprising:
   a distributor having a plurality of locations;
   a Digital Subscriber Line external interface receivable within one of said plurality of locations, said Digital Subscriber Line external interface operable to receive analog voice and digital packet content from a first Wide Area Network;
   a Direct Broadcasting Service external interface receivable within one of said plurality of locations, said Direct Broadcasting Service external interface operable to receive digital television content from a second Wide Area Network;
   a first home network interface including a divider circuit receivable within one of said plurality of locations, said first home network interface in communication with said Digital Subscriber Line external interface to distribute the analog voice content to at least one communication device;
   a second home network interface including a Local Area Network Hub receivable within one of said plurality of locations, said second home network interface in communication with said Digital Subscriber Line external interface to distribute the analog television content to at least one communication device; and
   a third home network interface including a divider circuit receivable within one of said plurality of locations, said third home network interface in communication with said Direct Broadcasting Service external interface to distribute the digital television content to at least one communication device.

9. The multi-media distribution system as recited in claim 8, wherein the Direct Broadcasting Service comprises satellite television.

10. The multi-media distribution system as recited in claim 8, furthering including a cable service external interface receivable within one of said plurality of locations, said cable service external interface operable to receive digital voice content and analog television content from a third Wide Area Network.

11. The multi-media distribution system as recited in claim 10, further including a fourth home network interface including a Local Area Network Hub receivable within one of said plurality of locations, said third home network interface in communication with said cable service external interface to distribute the digital voice content to at least one communication device.

12. The multi-media distribution system as recited in claim 10, further including a fourth home network interface including a feed through circuit receivable within one of said plurality of locations, said fifth home network interface in communication with the cable service external interface to distribute the analog television content to at least one communication device.

13. The multi-media distribution system as recited in claim 8, furthering including: a digital/analog-analog/digital converter in communication with said external interface;
   a central processing unit in communication with said digital/analog-analog/digital converter; and
   a peripheral bus in communication with said central processing unit to communicate said content to said home network interface.

14. The multi-media distribution system as recited in claim 12, wherein said peripheral bus communicates between a plurality of home network interfaces.

15. The multi-media distribution system as recited in claim 8, wherein said at least one communications device is selected from the group consisting of analog phones, personal computers, digital phones, analog televisions, and digital televisions.

16. A method of distributing multi-media content within a home/office environment, the method comprising the steps of:
   receiving DSL content from a first Wide Area Network at a Digital Subscriber Line external interface, wherein the Digital Subscriber Line external interface is receivable in one of a plurality of locations on a distributor;
   receiving DBS content from a second Wide Area Network at a Direct Broadcasting Service external interface, wherein the Direct Broadcasting Service external interface is receivable in one of the plurality of locations on the distributor;
   distributing the DSL content to at least one communication device with at least a first home network interface that includes a divider circuit receivable in one of the plurality of locations on the distributor, wherein the first home network interface is in communication with the Digital Subscriber Line external interface; and
   distributing the DBS content to at least one communication device with at least a second home network interface that includes a divider circuit receivable in one of the plurality of locations on the distributor, wherein the first home network interface is in communication with the Direct Broadcasting Service external interface.

17. The multi-media content distribution method of claim 16, wherein the DSL content comprises analog voice content, and the distributing of the DSL content comprises distributing the analog voice content to at least one communication device with the first home network interface that includes a divider circuit receivable in one of the plurality of locations on the distributor, wherein the first home network interface is in communication with the Digital Subscriber Line external interface.

18. The multi-media content distribution method of claim 16, wherein the DSL content comprises digital packet data content, and the distributing of the DSL content comprises distributing the digital packet data content to at least one communication device with a third home network interface that includes a Local Area Network Hub receivable in one of the plurality of locations on the distributor, wherein the third home network interface is in communication with the Digital Subscriber Line external interface.

19. The multi-media content distribution method of claim 16, wherein the DBS content comprises digital television content.

20. The multi-media content distribution method of claim 16, wherein the second Wide Area Network comprises a satellite television network.

* * * * *